Dec. 10, 1963   KANJI OGURA   3,113,814
SEALED BEARINGS
Filed Dec. 18, 1961
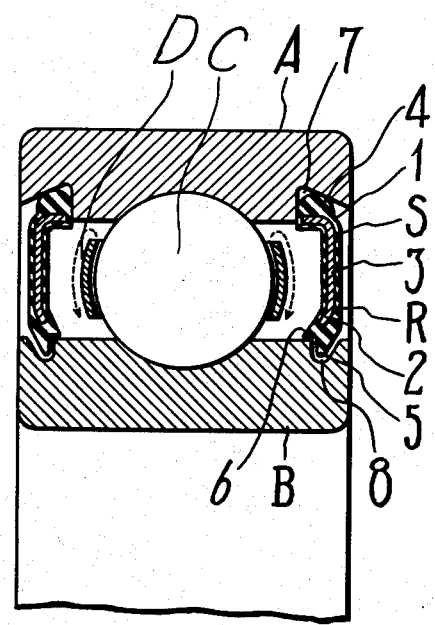
INVENTOR
KANJI OGURA
By
Mason, Fenwick & Lawrence
Attorneys

United States Patent Office 3,113,814
Patented Dec. 10, 1963

3,113,814
SEALED BEARINGS
Kanji Ogura, Minamiku, Osaka, Japan, assignor to Koyo Seiko Company, Ltd., Osaka, Japan, a corporation of Japan
Filed Dec. 18, 1961, Ser. No. 159,843
Claims priority, application Japan Dec. 20, 1960
5 Claims. (Cl. 308—187.2)

This invention relates to sealed bearings.

Efforts have been made heretofore to effect a labyrinth between an edge of a bearing seal and a groove of a rolling inner bearing race in grease tight sealed bearings. However, in some forms, it is very difficult to form a groove in the inner race or it is difficult to maintain a precise gap or spacing between the inner race and the adjacent edge of the seal. In such cases, the frictional contact between the adjacent edge of the seal and a side of the groove in the inner race is apt to damage the seal and destroy the proper sealing effect.

In case that edge of seal against inner race is made of metal, much frictional resistance arises, which not only obstructs the high speed rotation, but causes noise and heat by contact with inner race. This increases the seal's loss rate.

If the seal is made of the usual elastic material and is provided with tongue-shaped edge inserted into a groove of the inner race, to avoid the above mentioned disadvantage, fluid pressure arising from eccentric motion of the enclosed grease presses the tongue-shaped edge of the elastic seal to one side of the groove with progressively increasing pressure as the speed of rotation of the roller members increases. This spoils the labyrinth effect which may have been produced by the elastic tongue-shaped edge and groove. Furthermore, when the elastic tongue-shaped edge moves in the groove, axial displacement of the outer race relative to the inner race which sometimes occurs during rotation, pushes grease off of some of the working parts. In worst cases, grease is forced outside the bearing and is then drawn in again after contacting dirt and dust. Of course this defect of the seal being forced to one side of the groove into contact with the groove surface by pressure can be eliminated by making the seal of metal. However, it is exceedingly difficult to assemble metal seals precisely in proper position in the bearing, and such metal seals are often found to have the radial inner edge located against or adjacent a cylindrical edge surface portion of the inner race rather than in the groove of the inner race, so that an L-shaped gap occurs therebetween. Therefore, in order to try to attain a good labyrinth effect, seals having an elastic inner edge inserted lightly into the groove, rather than metal seal, are usually employed, but this, as stated above, does not maintain a true labyrinth effect because of distortion of the elastic edge into contact with a side of the groove by the grease pressure.

An object of the present invention, therefore, is the provision of novel resilient seal device for grease sealed ball bearings and the like wherein the seal is maintained out of contact with the inner race and forms a labyrinth between the radial inner edge of the seal and the groove of the inner race.

Another object of the present invention is the provision of a novel sealed ball bearing assembly of the type described in the next preceding paragraph, wherein the labyrinth effect is maintained regardless of fluid pressure and wherein friction loss is reduced to a minimum.

Other objects, advantages and capabilities of the present invention will become apparent from the following detailed description, taken in conjunction with the drawing.

The attached drawing is a view in central radial section through a sealed bearing illustrating the invention.

Referring to the drawing illustrating a preferred exemplary embodiment of the present invention, there is illustrated a ball bearing assembly which includes an annular outer race A, an annular inner race B concentrically and radially aligned with the outer race A, and a rolling element such as ball bearing C disposed in an annular concave race in the adjacent surface of the inner and outer race A, B, it being understood that a series of such balls are located in circumferentially spaced relation by suitable separator or cage D. The seal of the present invention comprises a seal body S having a relatively rigid center core formed by a metal ring 3 having a hook-shaped flange 1 at its radially outwardly disposed end extending toward the race-ways and a slightly inclined flange 2 at its radial inwardly disposed edge. The center ring 3 is covered by a rubber or similar plastic body R shaped to form an elastic, bead like projection 4 extending into suitable stop groove 7 in the outer race A and a forked seal formation along the inner edge of the seal having a radially inwardly extending elastic lip 5 adapted to project loosely into a V-shaped groove 8 in the outer diameter surface of the inner race B adjacent the end of the inner race, and tongue formation 6 extending axially inwardly of the bearing in proximity to the outer cylindrical surface of the inner race B. The seal is so dimensioned that the radical outer body projection 4 fits snugly into the stop groove 7 of the outer race A to fix the position of the seal relative to the bearing assembly, while the radially inwardly projecting lip 5 and the tongue formation 6 extend close but lie slightly out of contact with the adjacent portions of the inner race B. The lip 5 projecting into the V-shaped groove 8 forms the labyrinth, while the tongue formation 6, which has a substantially triangular profile and an axially inwardly directed apex, diverts the direction of flow of the grease inwardly toward the zone occupied by the balls, as indicated by the broken line arrows, to prevent grease flowing directly toward the groove 8 and the lip 5 disposed therein.

By reason of the action of the tongue formation 6 in guiding the grease flow axially inwardly toward the zone of the ball, it shields the elastic lip 5 from direct flow of grease and the position of the labyrinth-forming lip 5 of the groove 8 is always maintained to preserve the desired labyrinth effect regardless of the fluid pressure. Due to the relatively rigid center ring 3 which forms the center core of the seal body S, the inclined flange 2 of the ring 3 forms a base for the tongue formation 6 and lip 5 preventing undue deformation of these formations, and also permits the desired gap to be established between lip 5 and the groove 8 during installation of the seal in the bearing assembly. It will be apparent that if any minor adjustments in the angle of inclination of the flange 2 are required during installation to provide the desired gap between lip 5 and groove 8, this can be readily accomplished by further bending of the flange 2 with a suitable tool.

It will be appreciated that the labyrinth effect provided by lip 5 and groove 8 is extended along the region where the tongue formation 6 and the outer cylindrical portion of the inner race B are close to each other. With such an extended labyrinth effect, the grease will not be drawn in or forced out of the bearing even under high speed rotation conditions and thus wear and damage to bearings due to friction is held to a minimum and foreign matter is effectively excluded from entering the bearing. The hook-shaped character of the seal body at the radially outer edge thereof adapted to be seated in a stop groove of the character shown permits the central portion of the sealing body to be disposed substantially flushed with the end surface of the inner and outer race, thus increasing the grease accommodating capacity of the bearing.

It will be appreciated that the present invention is applicable to roller bearings of many different types, and is not limited to ball bearings only.

While only one preferred embodiment of the invention has been particularly shown and described, it is apparent that other modifications may be made in the invention without departing from the spirit and scope thereof, and it is desired, therefore, that only such limitations shall be placed thereon as are set forth in the appended claims.

I claim:

1. In an anti-friction bearing assembly including spaced relatively rotatable inner and outer race ring members disposed in concentric relation and held against relative axial movement, said inner ring member having a cylindrical outer surface having an annular outwardly opening sealing groove therein, a unitary seal carried by said outer ring member cooperating with said ring members to define one end of a sealed grease chamber between said ring members, said seal comprising an outer rubber-like elastic body having a rigid metallic reinforcing ring embedded therein with the elastic body in wholly covering relation to said metallic ring, said elastic body having a forked inner edge formation including a radially inwardly projecting lip portion and an axially projecting tongue portion, said lip portion conforming substantially to the cross-section of said sealing groove and extending into the same out of contact with the surface thereof to form a labyrinth passage therewith, said tongue portion being disposed in spaced concentric overlying relation to an annular portion of said cylindrical outer surface of said inner ring member immediately adjoining said sealing groove inwardly of said grease chamber, and said seal being constructed to maintain said lip portion and said tongue portion in slightly spaced relation to said sealing groove surfaces and the adjacent annular surface portions of said inner ring member over the range of fluid pressures encountered in said bearing assembly during use.

2. In an anti-friction bearing assembly including spaced relatively rotatable inner and outer race ring members disposed in concentric relation and held against relative axial movement, said outer ring member having a radially inwardly opening stop groove adjacent one end thereof and said inner ring including a cylindrical outer surface having an annular outwardly opening sealing groove therein, a unitary seal carried by said outer ring member cooperating with said ring members to define one end of a sealed grease chamber between said ring members, said seal comprising an annular outer rubber-like elastic body having an annular metallic ring core forming a relatively rigid reinforcing core embedded therein with the elastic body in wholly covering relation to said metallic ring, said elastic body including a bead-like formation along the outer edge thereof tightly seated in said stop groove and a forked inner edge formation including a radially inwardly projecting lip portion and an axially projecting tongue portion, said lip portion having an inwardly convergent, substantially triangular cross section providing an annular planar surface lying perpendicular to the axis of said ring members and facing the center of the grease chamber and an inclined annular surface lying in a conical path converging toward said axis and the adjacent end of said ring members, said sealing groove conforming substantially to the cross-section of said lip portion and said lip portion extending into the same out of contact with the surface thereof to form a labyrinth passage therewith, said tongue portion being of triangular cross-section having a radially inner cylindrical surface disposed in spaced concentric overlying relation to an annular portion of said cylindrical outer surface of said inner ring member immediately adjoining said sealing groove inwardly of said grease chamber and a radially outer frusto-conical surface converging inwardly of said grease chamber to a juncture with said inner cylindrical surface, and said seal being constructed to maintain said lip portion and said tongue portion in slightly spaced relation to said sealing groove surfaces and the adjacent annular surface portions of said inner ring member over the range of fluid pressures encountered in said bearing assembly during use.

3. In an anti-friction bearing assembly including spaced relatively rotatable inner and outer race ring members disposed in concentric relation and held against relative axial movement, said outer ring member having a radially inwardly opening stop groove adjacent one end thereof which is of substantially triangular cross-section providing an annular planiform stop shoulder lying perpendicular to the axis of the ring members spaced from said one end forming a side wall of the groove joined by a frusto-conical surface forming a base wall of the groove converging toward said axis to said one end, said inner ring including a cylindrical outer surface having an annular outwardly opening sealing groove therein, a unitary seal carried by said outer ring member cooperating with said ring members to define one end of a sealed grease chamber between said ring members, said seal comprising an annular outer rubber-like elastic body having an annular metallic ring core forming a relatively rigid reinforcing core embedded therein with the elastic body in wholly covering relation to said metallic ring, said elastic body including a bead-like formation along the outer edge thereof tightly seated in said stop groove having an annular planar surface portion abutting said stop shoulder, said elastic body further including a forked inner edge formation including a radially inwardly projecting lip portion and an axially projecting tongue portion, said lip portion having an inwardly convergent, substantially triangular cross section providing an annular planar surface lying perpendicular to the axis of said ring members and facing the center of the grease chamber and an inclined annular surface lying in a conical path converging toward said axis and the adjacent end of said ring members, said sealing groove conforming substantially to the cross-section of said lip portion and said lip portion extending into the same out of contact with the surface thereof to form a labyrinth passage therewith, said tongue portion being of triangular cross-section having a radially inner cylindrical surface disposed in spaced concentric overlying relation to an annular portion of said cylindrical outer surface of said inner ring member immediately adjoining said sealing groove inwardly of said grease chamber and a radially outer frusto-conical surface converging inwardly of said grease chamber to a juncture with said inner cylindrical surface, and said seal being constructed to maintain said lip portion and said tongue portion in slightly spaced relation to said sealing groove surfaces and the adjacent annular surface portions of said inner ring member over the range of fluid pressures encountered in said bearing assembly during use.

4. The combination recited in claim 3 wherein said metallic ring core is provided with a flange along the radially inner edge thereof inclined along a frusto-conical path toward the center of the grease chamber for limiting deflection of said lip portion and tongue portion to prevent engagement of said portions with the adjacent surfaces of said inner ring member.

5. The combination recited in claim 4, wherein said metallic ring core is provided with a hook-shaped flange along the outer periphery thereof with said bead-like formation projecting beyond said hook-shaped flange.

References Cited in the file of this patent

UNITED STATES PATENTS

| | | |
|---|---|---|
| 2,755,113 | Baumheckel | July 17, 1956 |
| 2,759,778 | Anderson | Aug. 21, 1956 |
| 2,856,208 | Cobb | Oct. 14, 1958 |

FOREIGN PATENTS

| | | |
|---|---|---|
| 546,260 | Great Britain | July 3, 1942 |